(12) United States Patent
Smith et al.

(10) Patent No.: US 8,588,230 B1
(45) Date of Patent: *Nov. 19, 2013

(54) TANDEM CALL ADMISSION CONTROL BY PROXY FOR USE WITH NON-HOP-BY-HOP VOIP SIGNALING PROTOCOLS

(71) Applicant: Rockstar Bidco, LP, New York, NY (US)

(72) Inventors: Peter Ashwood Smith, Gatineau (CA); Kent E. Felske, Kanata (CA); Hongyi Li, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,903

(22) Filed: Jan. 11, 2013

Related U.S. Application Data

(63) Continuation of application No. 11/186,092, filed on Jul. 21, 2005, now Pat. No. 8,369,322.

(51) Int. Cl.
*H04L 12/28* (2006.01)
*G01R 31/08* (2006.01)

(52) U.S. Cl.
USPC .......................................................... 370/389

(58) Field of Classification Search
USPC ................................................. 370/389, 229
See application file for complete search history.

*Primary Examiner* — Mark Rinehart
*Assistant Examiner* — Angel Brockman
(74) *Attorney, Agent, or Firm* — Guerin & Rodriguez, LLP

(57) ABSTRACT

A method of determining whether to set up a delay-sensitive communication session over an internet protocol (IP) based network includes sharing link state information among the network nodes of the link state protocol controlled network, receiving an IP packet that conveys a request to set up a delay-sensitive communication session over the network; determining, based on the shared link state information, a shortest path through the link state protocol controlled network for the requested delay-sensitive communication session and whether the shortest path is deemed suitable for the delay-sensitive communication session, and setting up the delay-sensitive communication session over the shortest path only when the shortest path is deemed suitable for the delay-sensitive communication session.

25 Claims, 5 Drawing Sheets

US 8,588,230 B1

TANDEM CALL ADMISSION CONTROL BY PROXY FOR USE WITH NON-HOP-BY-HOP VOIP SIGNALING PROTOCOLS

RELATED APPLICATION

This application is a continuation application of co-pending U.S. patent application Ser. No. 11/186,092, titled "Tandem Call Admission Control By Proxy for use with Non-Hop-By-Hop VoIP Signaling Protocols," filed Jul. 21, 2005, the entirety of which is incorporated by reference herein.

FIELD OF THE INVENTION

The invention relates generally to the transmission of time-sensitive information over an Internet Protocol (IP) network. More specifically, the invention relates to call admission control for IP telephony.

BACKGROUND

An emerging alternative to traditional telephony is Internet Protocol (IP) telephony, also known as Voice over Internet Protocol (VoIP). In contrast to traditional telephony, which uses circuit-switched protocols to establish end-to-end circuits between endpoints, IP telephony uses the Internet Protocol to achieve real-time transmission of packetized voice signals over an IP network, such as the Internet. The Internet Protocol provides connectionless, best effort delivery of datagrams or packets through the IP network. Unlike data traffic, however, real-time voice traffic is sensitive to packet loss and latency. The problem of network congestion, therefore, has different repercussions for real-time delay-sensitive traffic, such as voice, than for data traffic. Techniques such as delaying, dropping, or retransmitting data packets during network congestion may achieve satisfactory results for purposes of transmitting data, whereas such actions would be detrimental to the quality of service expected by end-users conducting a real-time IP telephone call. Consequently, it is preferable to deny access to an IP network experiencing congestion than to permit voice traffic onto the network, if the network is only going to delay or drop the voice traffic and thereby produce an unsatisfactory, if not irritating, telephone call.

To avoid such consequences, networks employ call admission control (CAC) techniques to determine, before establishing a new IP telephone call, whether network resources are available to support the call at an acceptable quality of service. In general, if the needed network resources are available, the network accepts the call; otherwise, the call is rejected from the start. In some networks, every hop in the network can participate in the decision to accept or reject the establishment of a new IP call. When individual hops in a "hop-by-hop" network individually perform CAC, the CAC mechanism can be referred to as tandem call admission control.

Implementations of IP telephony use a variety of signaling protocols, which include the H.323 family of protocols and the Session Initiation Protocol (SIP). In general, an IP telephony signaling protocol employs signaling messages to invite, accept, and reject the creation of sessions, such as Internet multimedia conferences, Internet telephone calls, and multimedia distribution. However, some IP telephony signaling protocols, (e.g., SIP), do not have tandem CAC capability, and thus cannot make hop-by-hop decisions regarding whether to accept or reject a new IP call.

SUMMARY

In one aspect, the invention features a method of determining whether to set up a delay-sensitive communication session over an internet protocol (IP) based network. The IP based network comprises at least one link state protocol controlled network. The link state protocol controlled network comprises a plurality of network nodes interconnected by links. The method comprises sharing link state information among the network nodes of the link state protocol controlled network, receiving an IP packet conveying a request to set up a delay-sensitive communication session over the network, determining, based on the shared link state information, a shortest path through the link state protocol controlled network for the requested delay-sensitive communication session, determining, based on the shared link state information, whether the shortest path is deemed suitable for the delay-sensitive communication session, and setting up the delay-sensitive communication session over the shortest path only when the shortest path is deemed suitable for the delay-sensitive communication session.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
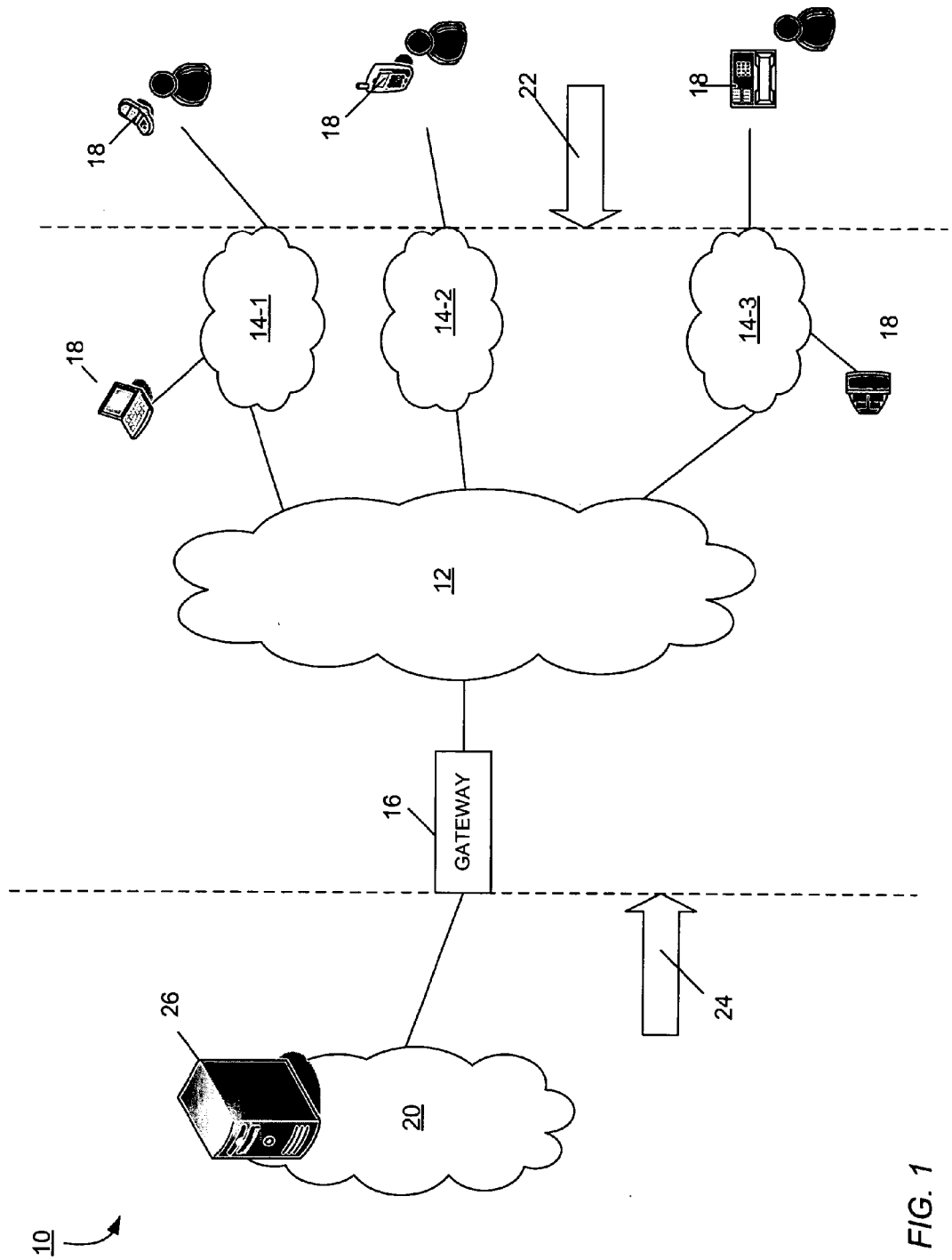
FIG. 1 is a block diagram of an exemplary networking environment in which aspects of the invention may be implemented, the exemplary networking environment including a plurality of link-state networks in communication with a gateway device through an IP-based network.

Systems and methods embodying the present invention achieve tandem call admission control (CAC) by proxy. In general, each node in a link-state network independently determines whether each of its outgoing links is presently available to support high-priority traffic (i.e., voice, video). Using a link-state routing protocol, each node disseminates its outgoing link-status determinations to each of the other nodes in the link-state network and receives the link-status determinations from each of the other nodes in the link-state network. As a result, each node in the link-state network possesses a link-status for each link in the link-state network, including the availability or unavailability of that link for supporting high-priority traffic.

A network device external to the link-state network can acquire—from any one or all of the nodes in the link-state network, also referred to, in contrast, as internal network devices—the link-status for each link in the link-state network. When an invitation to establish a call arrives at the external network device, the network device can accept or reject the call based on link-status information acquired from the individual nodes in the link-state network. From the acquired link-status information, the external network device determines the shortest path (i.e., a minimum metric route) through the link-state network that the call would take if the call is admitted.

To intercept a call, the network device has the ability to inspect the contents of an IP packet and recognize a signaling protocol message (e.g., a SIP invite) embodied therein. In effect, each node has participated in call admission control by making local decisions regarding its outgoing links and the network device has acted as a proxy for the nodes by acquiring and using the link-status information gathered by the nodes to accept or reject a new call.

It is not necessary for the network device to be able to intercept signaling protocol messages in order to practice the invention. For example, in one embodiment, each of the nodes of the link-state network has the ability to intercept a call invitation and make a determination regarding whether to accept or reject the call based on the link-status acquired from each node in the link-state network. In this embodiment, each node can serve as a proxy. In another embodiment, both the network device and each node perform as proxies. In still other embodiments, fewer than all nodes in the link-state network are configured to intercept call invitations—with and without a similar capability in the external network device.

Although described herein primarily with reference to the transmission of voice over an IP network, and with specific reference to the SIP signaling protocol, the principles of the invention extend also to the transmission of other types of time-sensitive media, such as video, and to the use of other types of non-hop-by-hop signaling protocols, such as H.323, that serve to establish and terminate real-time sessions over an IP network.

FIG. 1 shows an embodiment of a networking environment 10 in which the invention may be practiced. The networking environment 10 includes an internet protocol (IP)-based network 12 in communication with a plurality of link-state networks 14-1, 14-2, 14-3 (generally, 14) and with a gateway 16. Exemplary implementations of the IP network 12 include, but are not limited to, a packet network, a private internet, the public Internet, a wide-area network (WAN).

Each link-state network 14 is a separate domain or area that employs a link-state routing protocol to determine a shortest path along which to forward datagrams or packets through that packet-based network 14. Hereafter, general references to packets encompasses datagrams as well. Examples of link-state routing protocols for establishing paths include, but are not limited to, Open Shortest Path First (OSPF), Intermediate System to Intermediate System (IS-IS), and public network-to-network interface (PNNI). Link-state routing protocols such as OSPF and IS-IS operate by reliably flooding topology information throughout the link-state network 14. From the topology information, each node or router in the link-state network 14 independently constructs a topological map of the link-state network. Packets pass through the link-state network 14 to their destinations along the shortest path on a hop-by-hop basis. No consideration is given to content of the packets, i.e., the packets are forwarded hop-by-hop along the shortest path irrespective of whether such packets are part of a IP telephone session or carry data.

The OSPF routing protocol, for example, employs flooding to disseminate link-state advertisement (LSA) packets throughout the link-state network 14. Traffic-engineering protocols, such as OSPF-TE, IS-IS-TE, and MPLS-TE, disseminate LSA packets with special extensions for conveying traffic engineering information, such as bandwidth availability, transmission delay, packet loss, and link utilization.

The gateway 16 is a network device that interconnects a second IP-based network 20 (e.g., an enterprise network, Ethernet network) and the IP-based network 12. A function of the gateway 16 resides at a network boundary between known and unknown network topologies and operates to find IP packet destinations in the known network topology.

In communication with each link-state network 14 is one or more end-user devices 18. Example implementations of end-user devices 18 include, but are not limited to, laptop computers, cell phones, smart phones, handheld devices, IP telephones, and digital televisions. End-user devices 18 can initiate outgoing calls that pass to a link-state network 14 (denoted by arrow 22). A call, as used herein, refers to a real-time (or near real-time), end-to-end communication session between two or more end-user devices 18 involving the transmission of voice, video, or a combination thereof. Real-time communications can have perceptible delays, although preferably such delays are minimal in order to achieve an acceptable quality of service. In addition to the transmission of voice, video, or both, a call can entail the exchange of data and command signals between the sourcing end-user and its target. The target of an outgoing call can be an end-user device coupled to the same link-state network 14, to a different link-state network 14, or to the second network 20.

End-user devices 18 can also receive incoming calls. An incoming call targeted to a given end-user device 18 arrives at the gateway 16 (denoted by arrow 24) and is routed through the IP-based network 12 and through the link-state network 14 to which the target end-user device 18 is operably coupled. The routing protocol in use in the link-state network 14, such as OSPF, determines the paths by which the incoming and outgoing calls proceed through the link-state network 14 towards their target destinations. For any given call, the routing protocol results in a shortest path that each packet associated with that call will traverse to reach the target destination—provided the call is established. As used herein, a shortest path is a route that satisfies a minimum metric, for example, but not limited to, packet delay or number of hops.

In one embodiment, calls traverse the networking environment 10 under the control of the SIP signaling protocol. In this embodiment, the networking environment 10 includes a SIP server 26 for conducting an end-to-end session between two end-points (i.e., source and destination end-user devices 18). In general, the SIP server 26 establishes, manages, and terminates calls between end-user devices. Typically, the SIP server 26 resides externally to the link-state networks 14 and, in some embodiments, can be part of a link-state network. Here, in FIG. 1, the SIP server 26 is coupled to the second network 20; in other embodiments of the networking environment 10, the SIP server 26 can be part of the IP-based network 12.

The SIP server 26 can be a set of servers with specialized software for identifying the source device, finding the destination device, matching the local IP address of the source end-user device with a national IP address, and sending a dial message to the destination end-user device. The end-user devices 18 run client software that communicates with the specialized software of the SIP server 26 for implementing the various functionalities.

For each transmitted voice segment, SIP requires an additional header component to the traditional TCP/UDP and IP headers. The additional header component conveys specific messages for performing the various stages of a call, such as establishing, handling, and terminating the call. To initiate an IP telephone call, a source end-user device 18 dials a phone number of a destination end-user device (i.e., issues an invite-call message). The SIP server 26 receives the invite-call message and determines the network location of the destination end-user device. The SIP server 26 then sends the invite-call message towards the destination end-user device. Upon receiving an invite-call message, the destination end-user device responds with certain messages, including a message indicating the destination device is ringing and another "off-hook" message when the user answers the phone. After the source end-user device receives and acknowledges the off-hook message, the source and destination end-user devices can exchange IP voice content, using UDP (user datagram protocol) and RTP (real-time protocol).

As described in more detail below, one or more of the network devices in the networking environment 10 is capable of intercepting an invite-call message, which can arrive at the network device indirectly—from the SIP server—or directly from an end-user device. The network device then determines the shortest path through one of the link-state networks 14 to be taken by the voice traffic and decides whether to reject that call based upon link-status information associated with the path. Upon determining to reject the call, the network device returns a "cancel-call" message to the sender of the invite-call message (i.e., the forwarding SIP server or the originating end-user device).

Figure 2:
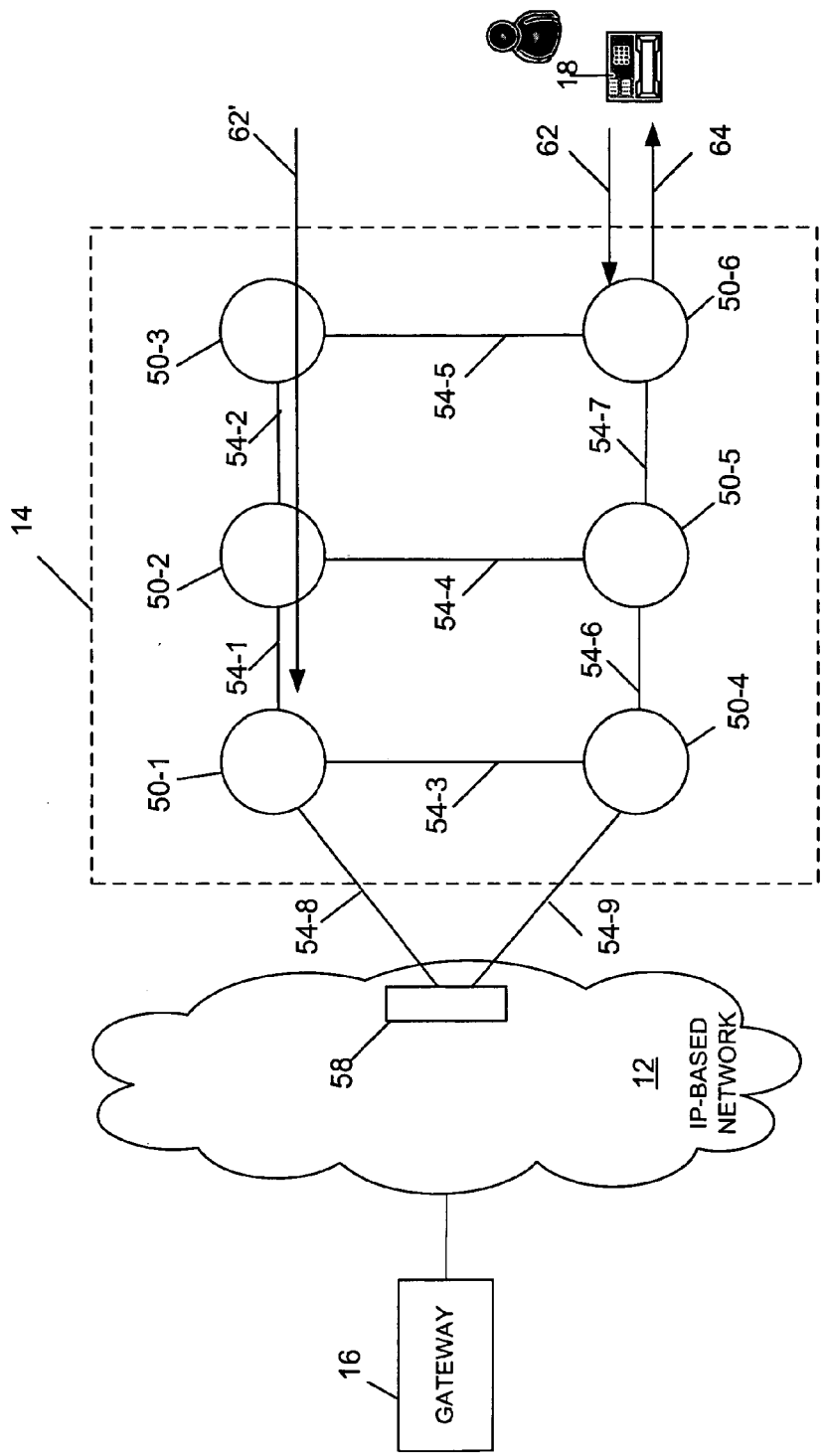
FIG. 2 is a block diagram of a portion of the networking environment of FIG. 1, more specifically, the gateway device, the IP-based network, and an exemplary one of the link-state networks.

FIG. 2 shows one embodiment of one of the link-state networks of FIG. 1 (here, 14-1). In this embodiment, the link-state network 14-1 includes a plurality of routers 50-1, 50-2, 50-3, 50-4, 50-5, and 50-6 (generally, 50) interconnected to each other by links 54-1, 54-2, 54-3, 54-4, 54-5, 54-6, and 54-7 (generally, 54). The links 54 between neighboring routers 50 can be wireless or wired (including optical fiber) connections, that is, all of the links 54 can be wireless, all of the links 54 can be wired, or the links 54 can be a combination of wireless and wired connections (i.e., at least one link is wireless and at least one link is wired).

The routers 50 can be Multi-protocol Label Switched (MPLS)-enabled network devices. Before the transmission of packets, the link-state network 14-1 establishes a tunnel, also called a label-switched path (LSP), comprised of the ingress, egress, and intermediate routers. Routing protocols, such as OSPF and IS-IS, distribute the topology information required to identify the path of the tunnel through the link-state network 14.

Routers 50-1 and 50-4 are also in communication with a network device 58 by way of links 54-8 and 54-9 respectively. This network device is on the IP-based network 12, external to the link-state network 14. As an example, links 54-8, 54-9 may also be considered external to the link-state network 14-1; thus, the routers 50-1, 50-4 do not advertise the link-status information concerning these links to neighboring routers 50 of the link-state network 14-1.

For purposes of illustration, consider that the routers 50 use the OSPF routing protocol to disseminate information throughout the link-state network 14. Periodically—e.g., every 20 seconds—each router in an OSPF area encodes link state and traffic engineering information about its outgoing links into LSA packets, and forwards such LSA packets to all neighbors. One or more advertised parameters in the LSA packets can be specific to high-priority traffic, e.g., voice, video. Such advertised parameters can include, for example, link utilization, as measured by the current number of high-priority packets in queue, link delay, and the percentage of recent packet loss (e.g., out of the last 100 packets).

Each router receiving an incoming LSA packet forwards that LSA packet to all neighbors other than the neighbor from which the LSA packet arrived. For reliability purposes, this neighbor receives an acknowledgement of the LSA packet from the receiving router. From incoming LSA packets received from every other router in the link-state network 14, each router 50 builds the same topological map of the links 54 in the link-state network 14-1. Each router 50 also maintains a traffic-engineering database, in which is stored the "cost" of transmitting packets over each of the links in accordance with the traffic engineering information obtained from the LSA packets.

Each router 50 also independently determines the availability of its outgoing links for purposes of carrying high-priority traffic. One basis for the availability of a given link to support high-priority traffic can be whether there is sufficient bandwidth available on the link to support high-priority traffic, e.g., the link has a sufficient amount of unused bandwidth or bandwidth that can be taken from lower priority traffic. For instance, each router can monitor link utilization for high-priority traffic and determine that it does not want to receive any more traffic of this type when the utilization exceeds a particular threshold. Another basis for link availability can be to operate according to traffic-engineering policy. For example, an administrator may choose to configure a particular router so that it does not handle high-priority traffic.

In one embodiment, each router 50 of the link-state network 14-1 advertises the availability of each of its outgoing links in the LSA packets. The advertised information can be a single bit of data representing a yes-or-no availability indicator: a '1' bit value for a particular link, for example, can indicate that the link is currently available for supporting high-priority traffic, and a '0' bit value for the link can indicate that the link is unavailable to support high-priority traffic. The OSPF routing protocol, for example, permits the redefining of fields in an LSA packet, such as the type-of-service (TOS) field, which routers can use to disseminate availability indicators associated with its outgoing links.

In another embodiment, the routers 50 do not disseminate availability indicators; rather, each router computes the bit value for each of the links in the link-state network 14-1 from the traffic engineering information in the distributed LSA packets. Whether it receives or computes availability indicators, each router 50 maintains a call-admission-control (CAC) table or database that holds the current availability indicator of each link in the link-state network 14-1. In addition, the availability indicator for each link can change with each new LSA received by a router. The rate of change of an availability indicator depends upon the maximum rate of flooding used by the particular routing protocol running in the link-state network.

Various network devices in the networking environment 10 can operate as a call interceptor. A call interceptor is a network device that is configured to examine an IP packet and determine from header information whether that IP packet carries an invite-call message. The call interceptor determines the intended (i.e., shortest) path through the link-state network 14 of the IP packet and accesses the local CAC table to determine if each link in the path is currently available to support the call. Examples of network devices in the networking environment that can operate as a call interceptor include, but are not limited to, the gateway 10, one or more of the routers 50, a server (not shown) to which invite-call messages are redirected, and combinations thereof.

When the call interceptor is part of the link-state network 14, e.g., the routers 50, then the call interceptor can build the CAC database directly from the traffic engineering information (or CAC link-availability bits) distributed accordingly to the flooding routing protocol.

When the call interceptor is external to the link-state network 14-1, e.g., the gateway 16, the call interceptor does not participate in the exchange of link-state information with the routers 50 in the link-state network 14-1. Rather than build a CAC database from distributed traffic engineering information, in one embodiment the external call interceptor sends a request to each router in the link-state network 14-1 to obtain the CAC link-status for each outgoing link of that router. In another embodiment, the external call interceptor sends this request to a select router only, which can provide all of the needed CAC link-status information because that router has accumulated the information from the other routers in the link-state network 14-1, as described above.

Figure 3:
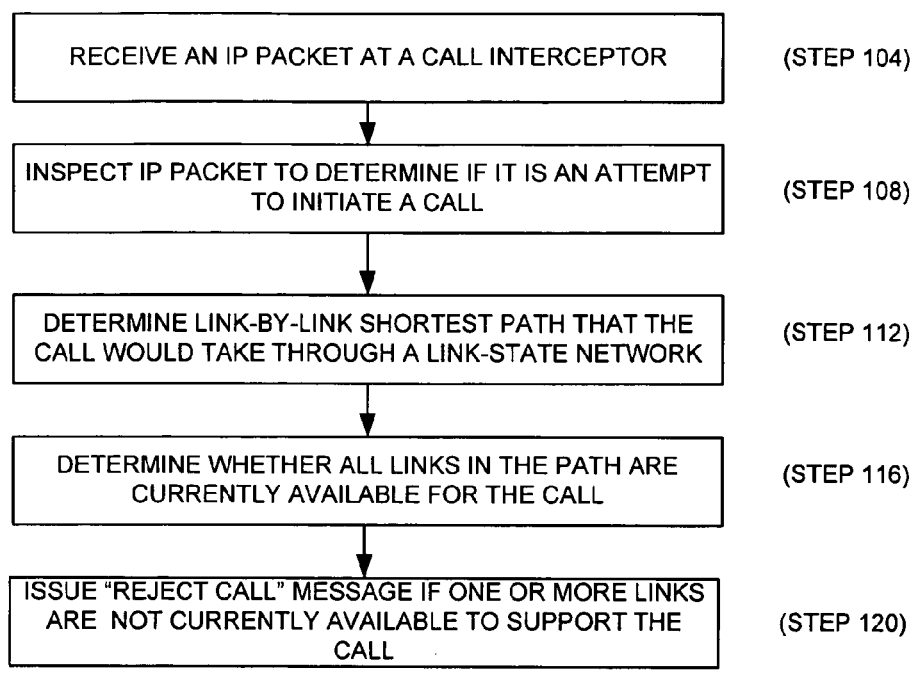
FIG. 3 is a flow diagram of an embodiment of a process for implementing call access control in accordance with the invention.

FIG. 3 shows an embodiment of a process 100 by which a call interceptor can determine whether to reject an invitation to establish a call. Reference is made to FIG. 2 in the description of the process 100. As described above, the call interceptor can be located external to (e.g., the gateway 16), internal to (i.e., router 50), or external and internal to the link-state network 14-1. Any network device that is a call interceptor has the capability of inspecting IP packets for a certain type of message, referred to generally as an "invite-call" message. For calls handled according to SIP, for example, the call interceptor can identify an invite message; for calls handled according to the H.323 protocol, for example, the call interceptor can identify an H.225 call setup message.

At step 104, an IP packet arrives at a call interceptor. The call interceptor inspects (step 108) the IP packet to determine whether it represents an attempt to initiate a call. If so, then the call interceptor determines (step 112) the hop-by-hop (or link-by-link) shortest path that the call would take through the link-state network. The call interceptor then determines (step 116) from its CAC table (or database) whether the links in the determined path are available to support high-priority traffic. If one of the links in this path is not currently available to support the high-priority traffic, then the call interceptor generates and forwards (step 120) a cancel call message to reject the invitation to establish a call. (Although one or more of the links may not currently support the high-priority traffic, during the next advertisement of traffic engineering information, the link-status may change. In addition, changes to the link-status of each link, which depend upon the frequency of advertisement flooding, occur independently of the number of invite-call messages arriving at the link-state network).

Consider, for example, that an IP packet 62 arrives at the router 50-6 from one of the end-user devices 18. In this example, the router 50-6 is configured to be a call interceptor, here for intercepting ingress calls from an end-user device 18. The router 50-6 inspects and determines that the IP packet carries an invite-message to establish a call. The router 50-6 determines the link-by-link shortest path that the call will take through the link-state network 14-1 and examines its CAC table to determine whether the links in the path are currently available to support the high-priority traffic associated with the call. Presume that the shortest path spans links 54-7, 54-4, and 54-1, and that the CAC table has availability bits "1", "0", and "1", respectively, for each of these links. The router 50-6 thus sends a cancel-call message 64 to reject the call because the link-status of link 54-4 is unavailable (here, a "0" link-status represents unavailable). This cancel-call message 64 propagates to the end-user device 18 attempting to establish the call. In addition, the invite-call message in the incoming IP packet 62 terminates at the router 50-6, i.e., it is not forwarded through the link-state network 14-1.

The proximity of a call interceptor to the source end-user device 18, e.g., in terms of hops, can produce a quicker decision regarding whether to reject the call than if the invite-call message needs to propagate through the network environment 10 to reach an SIP server, e.g., only then to be rejected. Advantageously, embodiments of the invention can thus make a user aware of a rejected call sooner than some present IP telephony CAC mechanisms.

If instead all links on the path are available for supporting high-priority traffic, a call interceptor forwards an IP packet carrying an invite-call message to the next hop for subsequent forwarding through the link-state network. This situation is illustrated in FIG. 2 in which router 50-3, acting as a call interceptor, intercepts an IP packet 62' carrying an invite-call message and determines that all links 54-2, 54-1 in a shortest path to be taken by high-priority traffic are available to support the call and forward an IP packet 62' carrying an invite-call message through the link-state network 14-1.

Figure 4:
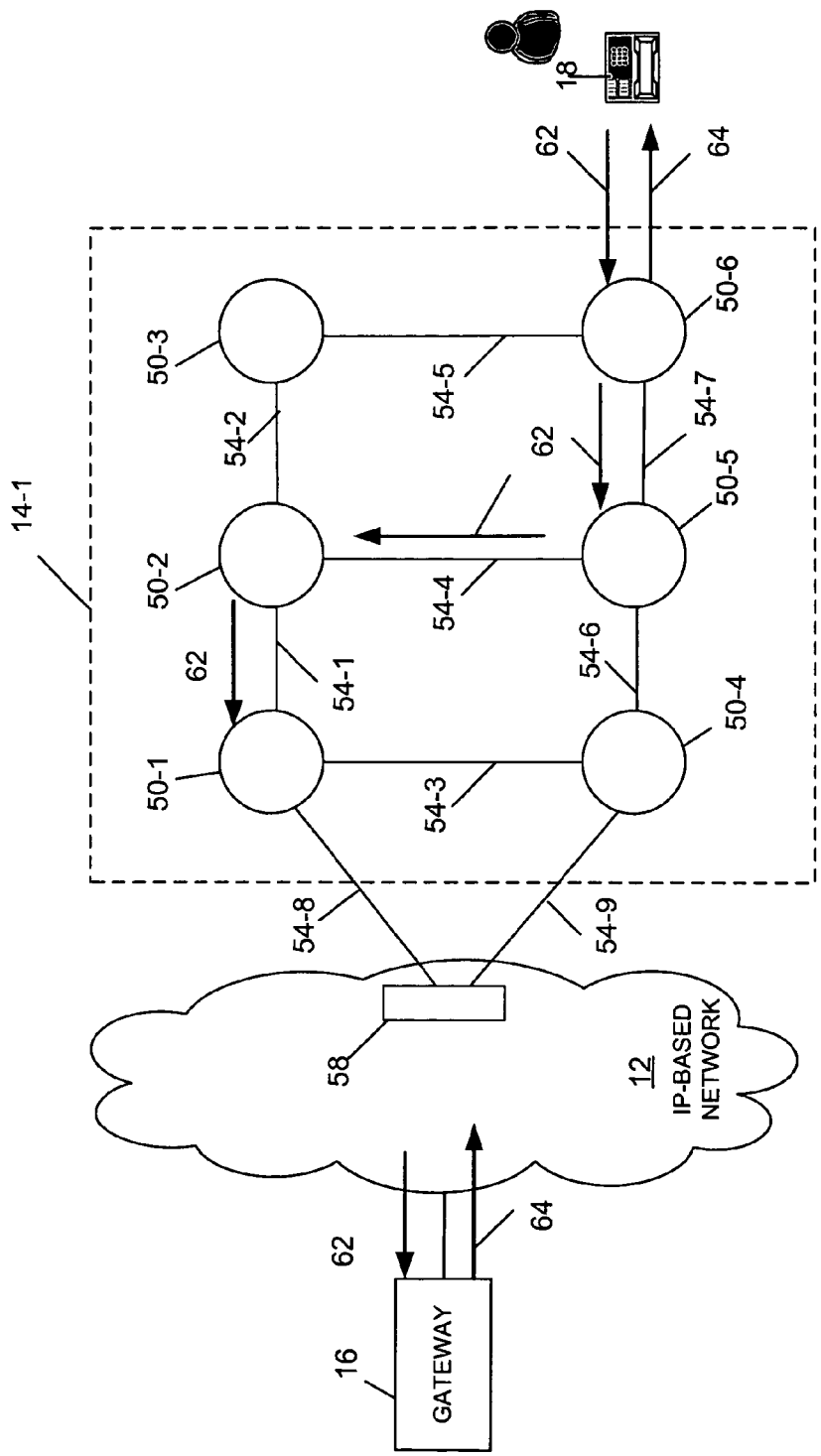
FIG. 4 is a block diagram of the portion of the networking environment shown in FIG. 2, in which the gateway performs call admission control for invite-call messages received through a link-state network.

FIG. 4 illustrates a variation of the previous example. Consider that each router 50 in the link-state network 14-1 does not possess sufficient processing capability to operate as a call interceptor, and that the gateway 16 is configured as a call interceptor. In this situation, the routers 50-6, 50-2, 50-1 along the shortest path each forwards the IP packet 62 with the invite-call message to the next hop. The IP packet 62 reaches the gateway 16, which inspects and determines that the IP packet 62 includes an invite-call message. The gateway 16 determines the link-by-link shortest path that the call will take to traverse the link-state network 14-1 and examines its local CAC table to determine whether the particular links in this path are currently available to support high-priority traffic. As described above, the gateway 16 acquires its CAC table by communicating with one router in the link-state network 14-1 from which to obtain a full CAC table built by that router or by communicating with each of the routers from which to obtain the link-status information specific to each router and build a full CAC table from the aggregated information.

As in the previous example, the shortest path spans links 54-7, 54-4, and 54-1, and the CAC table has availability bits "1", "0", and "1", respectively, for each of these links. The gateway 16 returns an IP packet 64 carrying a cancel-call message through the link-state network 14-1 to the source end-user device 18 because the link-status of link 54-4 is unavailable. The IP packet 64 can take the same or a different path through the link-state network 14-1 than the IP packet 62 with the invite-call message. The invite-call message terminates at the gateway 16 without further forwarding through the networking environment 10.

The ability to intercept invite-call messages at a network device that is external to link-state network, such as the gateway 16, avoids having to intercept at each router within the link-state network. This is advantageous in link-state networks employing MPLS tunnels, particularly if encryption is used. Without an external call interceptor, each MPLS-enabled router within the link-state network would have to intercept IP packets in order to determine whether an IP packet carried an invite-call message. This interception would entail unpacking and then repacking—and potentially decrypting and re-encrypting—each IP packet to access the embedded end-to-end SIP signaling. The external call interceptor can thus make the reject-or-accept decision outside of the domain of the link-state network, i.e., as proxy for the routers within the link-state network domain, so that MPLS tunnels can operate within the link-state network unaffected by tandem routers having to intercept, unpack, and repack the IP packets.

Figure 5:
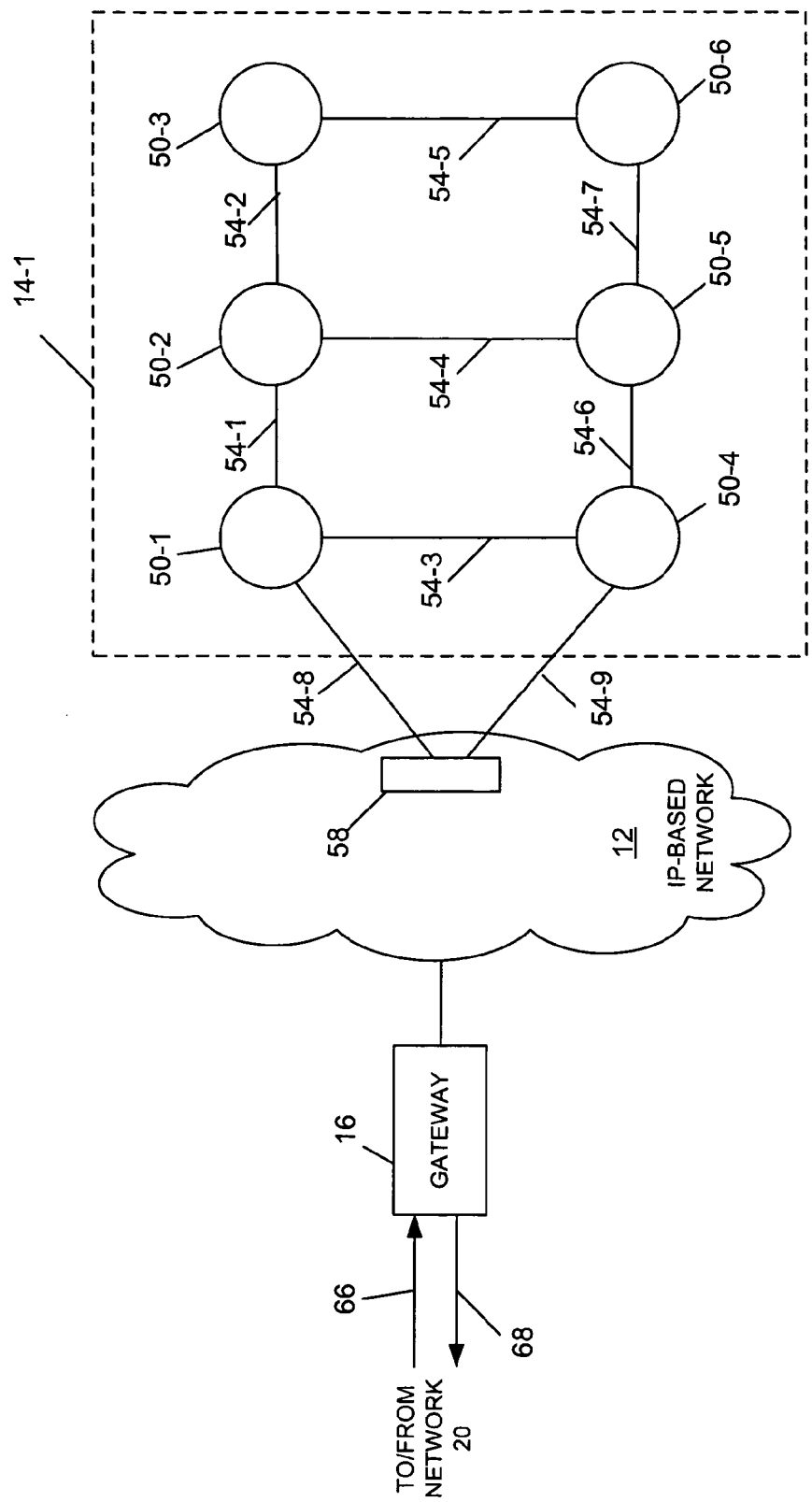
FIG. 5 is a block diagram of the portion of the networking environment shown in FIG. 2, in which the gateway performs call admission control for invite-call messages being forwarded towards a link-state network.

FIG. 5 illustrates another example in which an IP packet 66 arrives at the gateway 16 from the second network 20 (FIG. 1). In this example, the gateway 16 operates as a call interceptor for egress calls, i.e., calls directed to an end-user device 18 coupled to a link-state network 14. Similar to the previous example, the gateway 16 inspects the IP packet 66 to determine whether it carries an invite-call message, determines the link-by-link shortest path that the call will take through the link-state network 14-1, and examines its CAC table to determine whether the links in the path can currently support high-priority traffic. The gateway 16 sends an IP packet 68 carrying a cancel-call message to reject the call if one of the links in the path is not currently available to support the high-priority traffic. This cancel-call message can pass to the SIP server 26 on the second network 20, which forwards the cancel-call message to the end-user device initiating the call.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method of determining whether to set up a delay-sensitive communication session over an internet protocol (IP) based network, the IP based network comprising at least one link state protocol controlled network, the link state protocol controlled network comprising a plurality of network nodes interconnected by links, the method comprising:
   sharing link state information among the network nodes of the link state protocol controlled network;
   receiving an IP packet conveying a request to set up a delay-sensitive communication session over the IP based network;
   determining, based on the shared link state information, a shortest path through the link state protocol controlled network for the requested delay-sensitive communication session;
   determining, based on the shared link state information, whether the shortest path is deemed suitable for the delay-sensitive communication session; and
   setting up the delay-sensitive communication session over the shortest path only when the shortest path is deemed suitable for the delay-sensitive communication session.

2. The method of claim 1, wherein the IP packet conveying a request to set up a delay-sensitive communication session comprises a session initiation protocol (SIP) message.

3. The method of claim 1, wherein a network device external to the link state protocol controlled network determines the shortest path, determines whether the shortest path is deemed suitable for the delay-sensitive communication session and initiates setting up of the delay-sensitive communication session only when the shortest path is deemed suitable for the delay-sensitive communication session based on link status information received from the link state protocol controlled network.

4. The method of claim 3, wherein the network device external to the link state protocol controlled network requests link state information from at least one network node of the link state protocol controlled network.

5. The method of claim 4, wherein the network device external to the link state protocol controlled network requests link state information from each network node of the link state protocol controlled network.

6. The method of claim 5, wherein the link state information requested from each network node comprises respective link status information for each outgoing link of that network node.

7. The method of claim 3, wherein the network device external to the link state protocol controlled network comprises a gateway connected to the link state protocol controlled network.

8. The method of claim 3, wherein the IP packet conveying the request to set up a delay-sensitive communication session is received at the network device external to the link state protocol controlled network.

9. The method of claim 3, wherein the link state controlled network is a Multi-Protocol Label Switching (MPLS) network and the shortest path comprises an MPLS tunnel.

10. The method of claim 1, wherein a network node of the link state protocol controlled network determines the shortest path, determines whether the shortest path is deemed suitable for the delay-sensitive communication session and initiates setting up of the delay-sensitive communication session only when the shortest path is deemed suitable for the delay-sensitive communication session based on the link state information shared among the network nodes.

11. The method of claim 10, wherein the link state information shared among the network nodes comprises link status information for each outgoing link of each network node.

12. The method of claim 1, wherein the IP packet conveying the request to set up a delay-sensitive communication session is received at a network node of the link state protocol controlled network.

13. The method of claim 1, wherein sharing link state information among network nodes of the link state protocol controlled network comprises receiving by each network node link state information from neighboring network nodes and populating at each network node a database containing link state information on each link in the link state protocol controlled network.

14. The method of claim 1, wherein determining a shortest path through the link state protocol controlled network for the delay-sensitive communication session comprises determining a path that meets a minimum metric.

15. The method of claim 14, wherein the minimum metric comprises a minimum number of hops.

16. The method of claim 14, wherein the minimum metric comprises a minimum packet delay.

17. The method of claim 1, wherein determining that the shortest path is deemed suitable for the delay-sensitive communication session comprises determining that each link on the shortest path is deemed suitable for the delay-sensitive communication session.

18. The method of claim 17, wherein determining that each link on the shortest path is deemed suitable for the delay-sensitive communication session comprises determining that each link on the shortest path has sufficient available bandwidth.

19. The method of claim 18, wherein determining that each link on the shortest path has sufficient available bandwidth comprises determining that each link on the shortest path has sufficient unused bandwidth.

20. The method of claim 18, wherein determining that each link on the shortest path has sufficient available bandwidth comprises determining that each link on the shortest path has a sufficient combination of unused bandwidth and bandwidth that can be taken from lower priority traffic.

21. The method of claim 18, wherein determining that each link on the shortest path has sufficient available bandwidth comprises:
   monitoring link utilization for at least one class of traffic;
   comparing the monitored link utilization to a threshold; and determining that the shortest path has sufficient bandwidth based on the comparison.

22. The method of claim 17, wherein determining that each link on the shortest path is deemed suitable for the delay-sensitive communication session comprises determining that the delay-sensitive communication session is consistent with traffic engineering policy set for each link on the shortest path.

23. The method of claim 1, comprising issuing a communication session rejection message when the shortest path is not deemed suitable for the delay-sensitive communication session.

24. The method of claim 1, wherein the delay-sensitive communication session comprises at least one of a voice call, a video session and a combined voice and video session.

25. The method of claim 1, wherein the delay-sensitive communication session entails exchange of at least one of data and command signals.

* * * * *